(12) United States Patent
Wang et al.

(10) Patent No.: US 8,934,020 B2
(45) Date of Patent: Jan. 13, 2015

(54) INTEGRATED VIDEO QUANTIZATION

(75) Inventors: Lei Wang, Clovis, CA (US); Farzin Aghdasi, Clovis, CA (US); Greg Millar, Coarsegold, CA (US)

(73) Assignee: Pelco, Inc., Clovis, CA (US)

( * ) Notice: Subject to any disclaimer, the term of this patent is extended or adjusted under 35 U.S.C. 154(b) by 402 days.

(21) Appl. No.: 13/335,703

(22) Filed: Dec. 22, 2011

(65) Prior Publication Data

US 2013/0162834 A1 Jun. 27, 2013

(51) Int. Cl.
*H04N 5/33* (2006.01)
(52) U.S. Cl.
USPC ............... 348/164; 348/E5.09; 375/240.03
(58) Field of Classification Search
CPC ............... H04N 19/00472; H04N 19/00193
USPC ................... 348/164, E5.09; 375/240.03; 378/240.01–240.29
See application file for complete search history.

(56) References Cited

U.S. PATENT DOCUMENTS

| | | | | |
|---|---|---|---|---|
| 6,765,962 B1* | 7/2004 | Lee et al. | ............... | 375/240.03 |
| 2005/0002572 A1* | 1/2005 | Saptharishi et al. | .......... | 382/224 |
| 2011/0158482 A1* | 6/2011 | Johnson et al. | ............... | 382/107 |

FOREIGN PATENT DOCUMENTS

| | | |
|---|---|---|
| EP | 1037470 A1 | 9/2000 |
| WO | 9319441 A1 | 9/1993 |
| WO | 02058000 A1 | 7/2002 |
| WO | 2010141772 A1 | 12/2010 |

OTHER PUBLICATIONS

Garcia, Alvaro, et al., "Real time video foreground extraction based on context-aware background subtraction", Technical report TR-GTI-UAM-2007, Feb. 1, 2007, pp. 1-4.
Piccardi, Massimo, "Background subtraction techniques: a review", 2004 IEEE International Conference on Systems, Man and Cybernetics, Oct. 10, 2004, vol. 4, pp. 3099-3104.
Su, Shu-Te, et al., "Moving Object Segmentation Using Improved Running Gaussian Average Background Model", Digital Image Computing: Techniques and Applications, 2008. Dicta '08, IEEE, Dec. 1, 2008, pp. 24-31.
International Search Report and Written Opinion for PCT/US2012/071967, mailed Mar. 25, 2013.
International Preliminary Report on Patentability dated Jul. 3, 2014 for International Application No. PCT/US2012/069045, 9 pages.

* cited by examiner

*Primary Examiner* — Behrooz Senfi
*Assistant Examiner* — Maria Vazquez Colon
(74) *Attorney, Agent, or Firm* — Hunter Clark PLLC

(57) ABSTRACT

Techniques for processing video content in a video camera are provided. The techniques include a method for processing video content in at video camera according to the disclosure includes capturing thermal video data using a thermal imaging sensor, determining quantization parameters for the thermal video data, quantizing the thermal video data to generate quantized thermal video data content and video quantization information, and transmitting the quantized thermal video data stream and the video quantization information to a video analytics server over a network.

20 Claims, 6 Drawing Sheets

INTEGRATED VIDEO QUANTIZATION

BACKGROUND

Thermal imaging, also referred to as infrared thermography, involves the use of thermal imaging cameras that are configured to detect radiation in the infrared range of the electromagnetic spectrum. The output from thermal cameras can be used to generate thermograms that represent the amount of infrared energy that is emitted, transmitted, and/or reflected by objects within the field of view of the thermal imaging camera.

Thermal imaging is used in a number of commercial and industrial applications. For example, thermal imaging can be used in surveillance systems to detect the presence of humans or other warm-blooded animals. Thermal imaging can also be used to detect vehicles or other equipment that has a thermal signature that differs from the background. Furthermore, thermal imaging systems can be used in low light conditions and in foggy, rainy, and smoky conditions where visible light camera system may be ineffective.

Conventional thermal video systems include a thermal camera that captures thermal video data and performs a quantization step on the captured video, and analytics software that processes the captured video to identify events that may require a response. For example, in a surveillance system that includes a thermal camera, the video analytics software can be configured to detect the presence of people or warm-blooded animals in a restricted area, such as an airport, a manufacturing facility, military installation, or other restricted access area. The analytics software can also be configured to detect vehicle activity within the area being monitored by the thermal camera.

SUMMARY

An example method for processing video content in a video camera according to the disclosure includes capturing thermal video data using a thermal imaging sensor, determining quantization parameters for the thermal video data, quantizing the thermal video data to generate quantized thermal video data content and video quantization information, and transmitting the quantized thermal video data stream and the video quantization information to a video analytics server over a network.

Implementations of such a method may include one or more of the following features. Determining the quantization parameters for the thermal video data includes constructing a histogram of the thermal video data captured by the thermal imaging sensor, and calculating an accumulated histogram based on the thermal video data. Calculating the accumulated histogram of the thermal video data includes solving the following equation: $H_{acc(i)} = \Sigma_{k=0}^{i} H_{raw}(k)$, $i \in [0, 2^p-1]$ where p is the number of bits of the raw thermal data. Determining a low-bound threshold and a high-bound threshold for the thermal video data, and determining a quantization step for the thermal video data. Determining the quantization step includes solving the following equation:

$$Q_S = \frac{B_h - B_l}{N_S}$$

where $B_h$ is the high-bound threshold of raw thermal video data received from the thermal imaging sensor, $B_l$ is the low bound threshold of thermal video data received from the thermal imaging sensor, and $N_s$ is the range of the thermal video data. Quantizing the thermal video data to generate the quantized thermal video data content and video quantization information further comprises solving the following equation:

$$Y_i' = \frac{Y_i - B_l}{Q_S},$$

$i \in [0, M \times N-1]$ where $Y_i'$ represents a quantized value based on a value $Y_i$ from the raw thermal video data. Determining quantization parameters for the video data further comprises generating a lookup table to map the quantized data for previously received thermal video content to quantization data for the thermal video content.

An example thermal video camera according to the disclosure includes means for capturing thermal video data using a thermal imaging sensor, means for determining quantization parameters for the thermal video data, means for quantizing the thermal video data to generate a quantized thermal video data content and video quantization information, and means for transmitting the quantized thermal video data stream and the video quantization information to a video analytics server over a network.

Implementations of such a video camera may include one or more of the following features. The means for determining the quantization parameters for the thermal video data further comprises means for constructing a histogram of the thermal video data captured by the thermal imaging sensor, and the thermal video camera includes means for calculating an accumulated histogram based on thermal video data. The means for calculating the accumulated histogram of the thermal video data includes means for solving the following equation: $H_{acc(i)} = \Sigma_{k=0}^{i} H_{raw}(k)$, $i \in [0, 2^p-1]$ where p is the number of bits of the raw thermal data. Means for determining a low-bound threshold and a high-bound threshold for the thermal video data, and means for determining a quantization step for the thermal video data. The means for determining the quantization step includes means for solving the following equation:

$$Q_S = \frac{B_h - B_l}{N_S}$$

where $B_h$ is the high-bound threshold of raw thermal video data received from the thermal imaging sensor, $B_l$ is the low bound threshold of thermal video data received from the thermal imaging sensor, and $N_s$ is the range of the quantized thermal video data. The means for quantizing the thermal video data to generate the quantized thermal video data content and video quantization information further comprises means solving the following equation:

$$Y_i' = \frac{Y_i - B_l}{Q_S},$$

$i \in [0, M \times N-1]$ wherein $Y_i'$ represents a quantized value based on the value $Y_i$ from the raw thermal video data.

An example tangible computer-readable medium having stored thereon computer-executable instructions for processing video content according to the disclosure includes code for capturing thermal video data using a thermal imaging sensor, code for determining quantization parameters for the thermal video data, code for quantizing the thermal video data to generate a quantized thermal video data content and video quantization information, and code for transmitting the quantized thermal video data stream and the video quantization information to a video analytics server over a network.

Implementations of such a computer-readable medium may include one or more of the following features. The code for determining the quantization parameters for the thermal video data further comprises code for constructing a histogram of the thermal video data captured by the thermal imaging sensor, and wherein the medium includes code for calculating an accumulated histogram based on thermal video data. The code for calculating the accumulated histogram of the thermal video data includes code for solving the following equation: $H_{acc(i)} = \Sigma_{k=0}^{i} H_{raw}(k)$, $i \in [0, 2^p-1]$ where p is the number of bits of the thermal data. Code for determining a low-bound threshold and a high-bound threshold for the thermal video data, and code for determining a quantization step for the thermal video data. The code for determining the quantization step includes code for solving the following equation:

$$Q_S = \frac{B_h - B_l}{N_S}$$

where $B_h$ is the high-bound threshold of raw thermal video data received from the thermal imaging sensor, $B_l$ is the low bound threshold of thermal video data received from the thermal imaging sensor, and $N_s$ is the range of the raw thermal video data. The code for quantizing the thermal video data to generate the quantized thermal video data content and video quantization parameters includes code for solving the following equation:

$$Y'_i = \frac{Y_i - B_l}{Q_S},$$

$i \in [0, M \times N]$ where $Y'_i$ represents a quantized value based on the value $Y_i$ from the raw thermal video data. The code for determining quantization parameters for the video data includes code for generating a lookup table to map the quantization data for the previously thermal video content to quantization data for current received thermal video content.

An example thermal video camera according to the disclosure includes a thermal imaging sensor configured to output thermal video data, a processor configured to execute program instructions to process the thermal video data output by the thermal imaging sensor, a tangible computer-readable memory coupled to processor, and a video quantization module stored in the memory. The video processing module being configured to determine quantization parameters for the thermal video data, quantize the thermal video data to generate a quantized thermal video data content and video quantization information, and transmit the quantized thermal video data stream and the video quantization information to a video analytics server over a network.

Implementations of such a video camera may include one or more of the following features. Determining the quantization parameters for the thermal video data the video quantization module is configured to construct a histogram of the thermal video data captured by the thermal imaging sensor, and the video quantization module is further configured to calculate an accumulated histogram based on thermal video data. The video quantization module is configured to solve the following equation to calculate an accumulated histogram based on thermal video data: $H_{acc(i)} = \Sigma_{k=0}^{i} H_{raw}(k)$, $i \in [0, 2^{Np}-1]$ where p is the number of bits of the thermal data. The video quantization module is further configured to: determine a low-bound threshold and a high-bound threshold for the thermal video data, and determine a quantization step for the thermal video data. The video quantization module is configured to solve the following equation when determining the quantization step:

$$Q_S = \frac{B_h - B_l}{N_S}$$

wherein $B_h$ is the high-bound threshold of raw thermal video data received from the thermal imaging sensor, $B_l$ is the low bound threshold of thermal video data received from the thermal imaging sensor, and $N_s$ is the range of the thermal video data. The video quantization module is configured to solve the following equation when quantizing the thermal video data to generate a quantized thermal video data content and video quantization parameters:

$$Y'_i = \frac{Y_i - B_l}{Q_S},$$

$i \in [0, M \times N-1]$ wherein $Y'_i$ represents a quantized value based on the value $Y_i$ from the raw thermal video data. When determining quantization parameters for the video data the video quantization module is configured to generate a lookup table to map the quantization data for the thermal video content from quantization data for previously received thermal video content.

An example computer-implemented method for processing video content in a video camera according to the disclosure includes receiving thermal video content and quantization parameters from a thermal video camera, comparing quantization parameters to quantization parameters used to quantize previously received thermal video content, converting the previously received thermal video content to use the quantization parameters included with the quantization information received from the thermal video camera if the quantization parameters received in the quantization information received from the thermal video camera are different than the quantization parameters used to quantize the previously received thermal video content.

Implementations of such a method may include one or more of the following features. Converting the previously received thermal video content to use the quantization parameters includes requantizing the previously received video content using a quantization parameter lookup table. The quantization information received from the thermal video camera includes a quantization parameter lookup table.

An example server for processing video content received from a thermal video camera according to the disclosure includes means for receiving thermal video content and quantization information from a thermal video camera, means for comparing quantization parameters included in the quantization information to quantization parameters used to quantize previously received thermal video content, and means for converting the previously received thermal video content to use the quantization parameters included with the quantization information received from the thermal video camera if the quantization parameters received in the quantization information received from the thermal video camera are different than the quantization parameters used to quantize the previously received thermal video content.

Implementations of such a server may include one or more of the following features. The means for converting the previously received thermal video content to use the quantization parameters further comprises means for requantizing the previously received video content using a quantization parameter lookup table. The quantization information received from the thermal video camera includes the quantization parameter lookup table.

An example tangible computer-readable medium having stored thereon computer-executable instructions for processing video content received from a thermal video camera includes code for receiving thermal video content and quantization information from a thermal video camera, code for comparing quantization parameters included in the quantization information to quantization parameters used to quantize previously received thermal video content, code for converting the previously received thermal video content to use the quantization parameters included with the quantization information received from the thermal video camera if the quantization parameters received in the quantization information received from the thermal video camera are different than the quantization parameters used to quantize the previously received thermal video content.

Implementations of such a medium may include one or more of the following features. The code for converting the previously received thermal video content to use the quantization parameters further comprises code for requantizing the previously received video content using a quantization parameter lookup table. The quantization information received from the thermal video camera includes the quantization parameters.

An example server for processing video content received from a thermal video camera according to the disclosure includes a network interface configured to receive thermal video content and quantization information from a thermal video camera via a network, a processor configured to execute program instructions to process the thermal video content and quantization information, a tangible computer-readable memory coupled to processor; and a video processing module stored in the memory. The video processing module is configured to compare quantization parameters included in the quantization information to quantization parameters used to quantize previously received thermal video content, convert the previously received thermal video content to use the quantization parameters included with the quantization information received from the thermal video camera if the quantization parameters received in the quantization information received from the thermal video camera are different than the quantization parameters used to quantize the previously received thermal video content.

Implementations of such a server may include one or more of the following features. Converting the previously received thermal video content to use the quantization parameters the video processing module is further configured to requantize the previously received video content using a quantization parameter lookup table. The quantization information received from the thermal video camera includes the quantization parameter lookup table.

DETAILED DESCRIPTION

Figure 1:
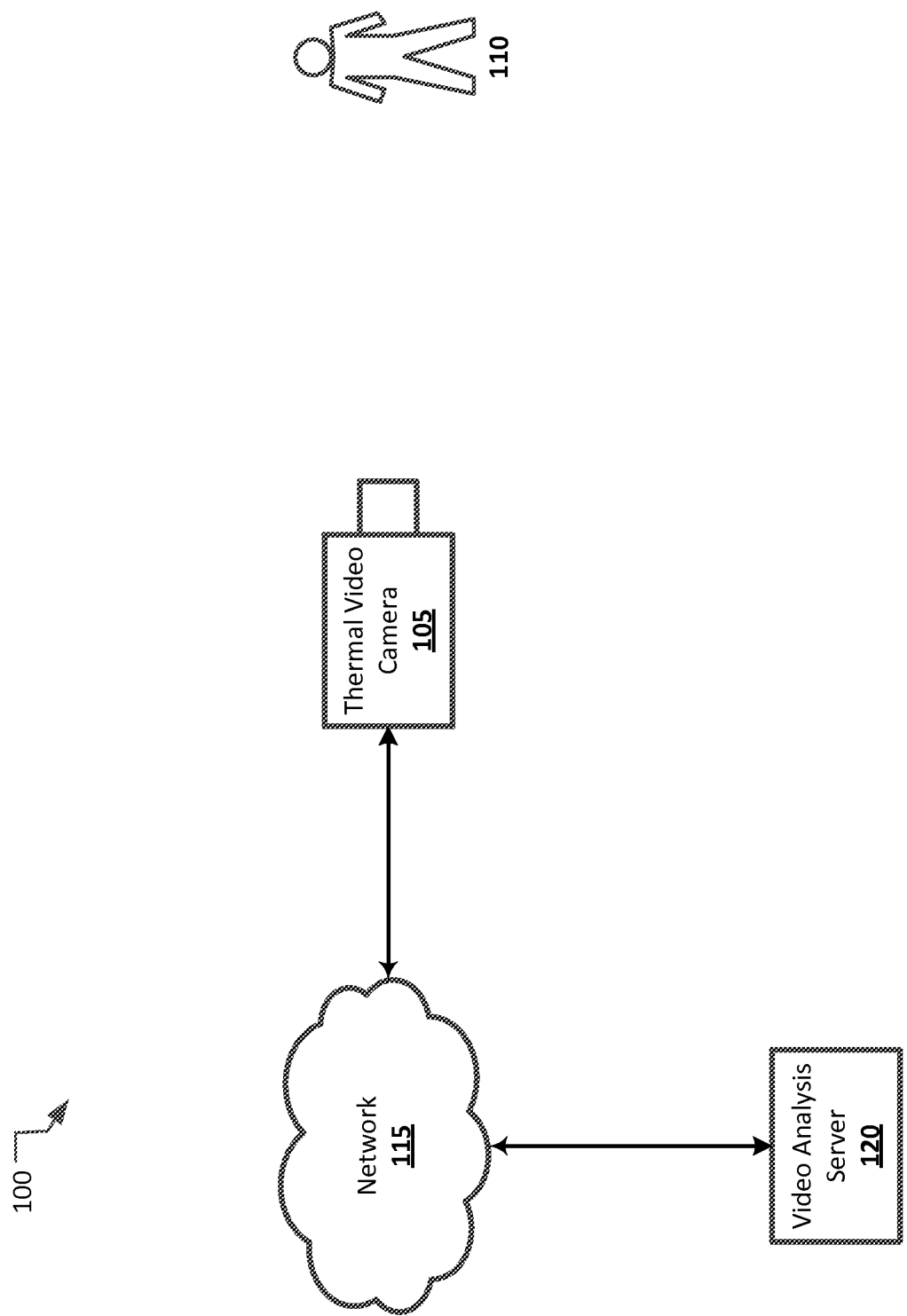
FIG. 1 is block diagram of a thermal imaging system that can be used to implement the techniques disclosed herein.

Techniques for integrated quantization of video content captured by thermal video cameras is provided. Thermal video can have a wide dynamic range that can be difficult to process properly. For example, over the course of a day, the temperature of a scene under surveillance can experience significant changes in temperature. As the temperature changes, the contrast in the thermal video captured by the thermal camera can change significantly. These changes can negatively impact the quantization of the thermal video and can result in false event detection by video analytics algorithms used to process the thermal video, e.g., if the video analytics software is not aware of changes in quantization due to the changing temperatures within the scene being captured on video.

Video analytics algorithms are typically configured to receive 8-bit video data as input. However, the thermal sensors typically used in thermal imaging systems have a wide dynamic range that allows the sensors to adapt to relatively large temperature changes over time. Many thermal camera systems provide 12-bit or 16-bit thermal video data for analytics which allows the camera system to represent this wide dynamic range. Consequently, the 12-bit or 16-bit thermal video data generated by the thermal sensor typically are converted to 8-bit video data expected by the video analytics algorithms. Thermal camera systems that generate thermal video having a different bit depth other than 8-bits can be used. If the bit depth of the thermal camera exceeds the bit depth that the video analytics algorithms are capable of handling, the thermal video output of the thermal camera can be converted to a lower bit depth that the video coding and analytics algorithms are capable of handling.

Video having a higher bit depth than can be supported by the video analytics algorithms can be converted to a lower bit-depth through a quantization step performed by the video camera. For example, the quantization process can convert greater than 8-bit thermal video data generated by the thermal sensor into 8-bit data as expected by the analytics algorithms.

Accuracy of quantization of the thermal video helps the video analytics algorithms used to process the video content can accurately detect suspicious objects in the environment being monitored, such as the presence of a person or a vehicle in a restricted area. The image pipe of the thermal camera calculates parameters for quantization of the thermal video data periodically to provide better quality video content for coding. When the quantization parameters change, the video brightness and contrast will change accordingly. When the video is fed to the video analytics algorithm, the change in brightness and contract can cause false detection of events.

In a conventional thermal imaging system, changes in the brightness and contrast are not easy to detect, because the analytics algorithms do not know the quantization parameters of the image pipe that were used to generate the thermal video content being processed by the analytics algorithms. With techniques disclosed herein, quantization parameters are provided by the thermal video camera along with the video content. These parameters and video content can be used by analytics algorithms to identify changes in brightness and contrast that could lead to false detection of events. Furthermore, data that has already been quantized using a previous set of quantization parameters can be re-quantized using a new set of quantization parameters received from the thermal video camera. This approach helps keep the video analytics data consistent even when the dynamic range and scene temperature change over time. This approach can generate processed thermal video that has better contrast in the scene. The improved contrast can enable the analytics algorithms to better detect motion in the thermal video and better detect moving objects in the thermal video content. The thermal video content generated using these techniques may also be good for display purposes and may be compatible with compression using various video compression techniques.

FIG. 1 is block diagram of a thermal imaging system 100 that can be used to implement the techniques disclosed herein. Thermal imaging system 100 includes a thermal video camera 105. The thermal video camera 105 is configured to capture infrared video of a scene, to quantize the data, and to transmit the data to video analysis server 120 via network 115. Network 115 can comprise one or more local area networks (LANs), wide area networks (WANs), or a combination thereof. Network 115 can be the Internet. Video analysis server 120 can be configured to apply one or more coding and analytic algorithms to the quantized video content received from the thermal video camera 105 to identify suspicious objects or motions within the environment. In alternative implementations, the video camera 105 can be configured to perform the functions of the video analysis server described herein. In such implementations, the network 115 is not required.

The thermal video camera 105 can be deployed at a location in a facility to identify unauthorized access to a restricted area, such as a port, an airport, an industrial complex, a military complex or other area where access is restricted or where the monitoring of the presence of people and/or vehicles is required. The thermal video camera 105 can be used in low light conditions or in conditions where providing illumination for a conventional optical video camera would be impractical. Thermal imaging can also be used in foggy, dusty, or smoky conditions where visibility may be significantly reduced or obscured by environmental conditions, which could severely limiting the effectiveness of an optical video camera.

The video analysis server 120 can be located at the same site at as the thermal video camera 105 or at a remote location. The video analysis server 120 can be located in a security operations center or other location in a location protected from weather and environmental conditions, while the thermal video camera 120 can be located in a location where the camera is subjected to thermal stress, wind, rain, dirt, smoke, pollution, and other environmental factors conditions.

The video analysis server 120 can be configured to detect the presence of people, vehicles, or warm-blooded animals, such as subject 110, that are within the area being monitored by the thermal video camera 105. Video analysis server 120 can also be configured to identify motion within the field of view of the camera. The analytics algorithms can be configured to recognize objects in the foreground of the thermal video content and objects in the background of the thermal video content. The analytics algorithms can be configured to distinguish between foreground elements and background elements by comparing frames of the thermal video content to identify motion and/or objects that are were not part of a previous frame. For example, the analytics algorithms applied by the video analysis server 120 can identify rocks, trees, and other objects that are part of the background and that should not trigger a warning that a suspicious object has been detected. The analytics algorithm can distinguish such background objects from foreground objects such as people, animals, or vehicles that appear in the scene.

The analytics algorithms can also be configured to identify motion that is part of the background. For example, the analytics algorithms can identify trees moving in the wind or a flag flapping in a breeze and can distinguish this motion from motion in the foreground. The analytics algorithms can use this information to identify potential threats while reducing or eliminating false alarms caused by motion in the background of a scene.

Figure 2:
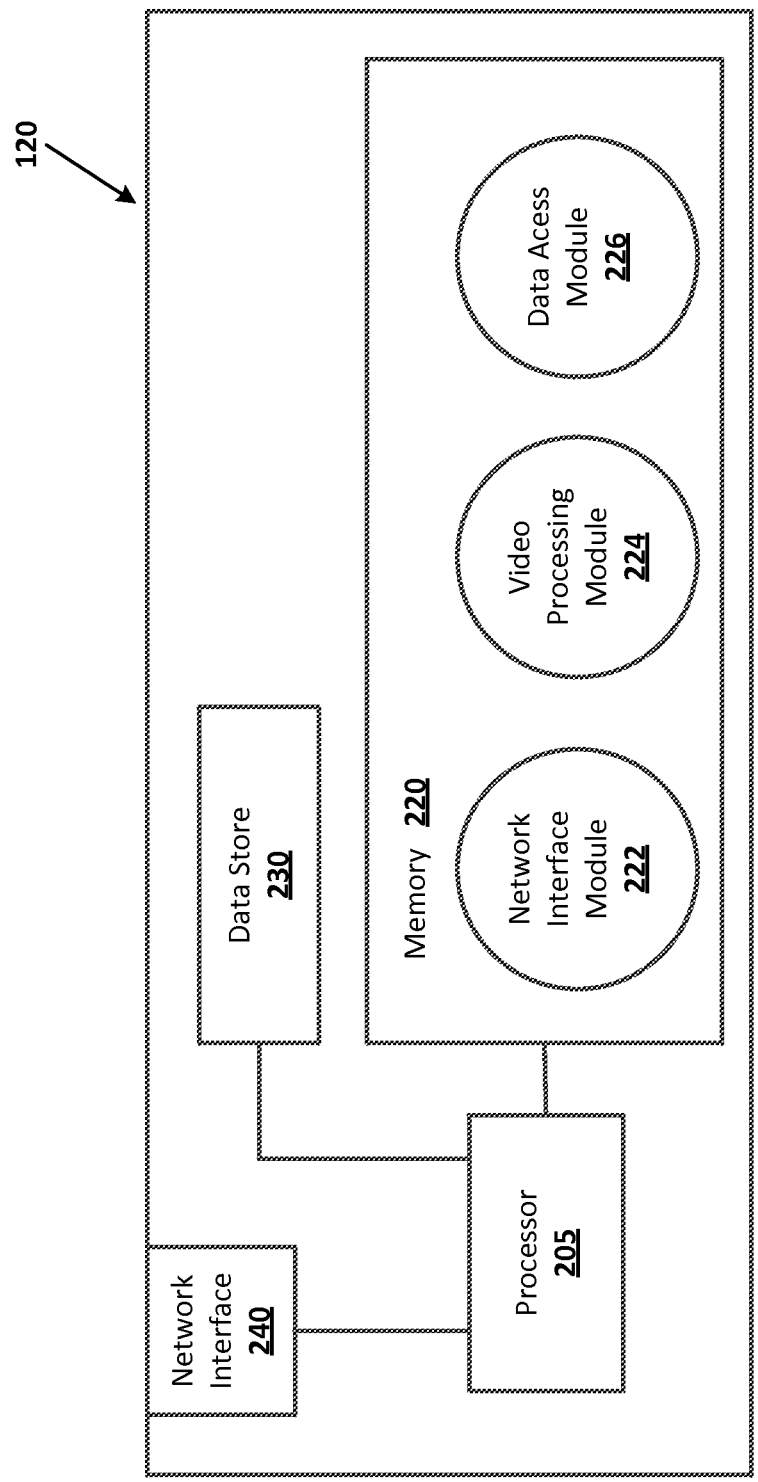
FIG. 2 is a block diagram of a video analysis server illustrated in FIG. 1.

FIG. 2 is a block diagram of an example of the video analysis server 120 illustrated in FIG. 1. Video analysis server 120 includes a processor 205, a memory 220, a data store 230, and a network interface 240. The memory 220 includes a network interface module 222, a video processing module 224, and a data access module 226. The memory 220 can comprise one or more types of tangible, non-transitory computer-readable memory, such as random-access memory (RAM), read-only memory (ROM), flash memory, or a combination thereof. The modules 222, 224, and 226 can comprise processor-executable instructions that can be executed by processor 205.

The processor 205 can comprise one or more microprocessors configured to access memory 220. The processor 205 can read data from and write data to memory 220. The processor 205 can also read executable program code from memory 220 and execute the program code.

Data store 230 can comprise a tangible, non-transitory memory that can be used to store thermal video data, quantization parameters, quantized thermal video content quantization data, and/or other data related received from the thermal video camera 105 via network 140. The data store 230 can also be used to store data generated by the various modules implemented in memory 220. In an alternative implementation, the data store 230 can be implemented in memory 230. The data store 230 can be a database that associates quantization data with thermal video. The video processing module 224 can be configured to use this quantization data to re-quantize thermal video content received from the thermal video camera 105 when the thermal video camera 105 indicates that there is a change in the quantization parameters for the video. The thermal video camera 105 can be configured to provide quantization information with thermal video content that is streamed from the thermal video camera 105 to the video analysis server 120 via the network 140. The thermal video camera 105 can also be configured to send updated quantization information used by the imaging pipeline of the thermal video camera 105.

The network interface module 222 is configured to receive data from the network 115 via network interface 240. The network interface module 222 can also be configured to transmit information to the thermal video camera 105 or other network-connected devices via network 140.

Video processing module 224 is configured to process video content received from the thermal video camera 105. The video processing module 224 can be configured to receive thermal video content and quantization information from the thermal video camera 105 and store the video content and the quantization information in the data store 230.

The video processing module 224 can apply one or more video analytics algorithms to the thermal video content that received from the thermal video camera 105. For example, the video processing module 224 can execute one or more analytics algorithms that can be used to identify events in the thermal video content, such as the presence of a person or animal in an area under surveillance or the arrival of a vehicle within the area under surveillance. The video processing module can be configured to re-quantize reference images based on previously received thermal video content received from the thermal video camera 105 when the thermal video camera 105 indicates that there has been a change in the quantization parameters associated with the video content currently being provided by the thermal video camera 105. For example, changes in temperatures of a scene over the course of the day can cause changes in the brightness and contrast of the scene. In a conventional thermal imaging system, the analytics algorithms would not be aware of these changes, which could result in the analytics algorithms generating a false positive identifying motion in the thermal video content or identifying a presence that is not actually in the scene. The video processing module 224 is configured to receive quantization information from the video camera 105 and to use that information to re-quantize the reference image or images that the analytics algorithm uses to identify motion or the presence of object within a scene. Re-quantization techniques are described in greater detail below with respect to FIGS. 4-6. The video processing module 224 can be configured to access video content stored in the data store 230 and re-quantize the content as new quantization parameters are received. For example, the video processing module 224 can update stored images and background models should be updated to include changes in quantization that could result in errors in identifying suspicious objects that appear within the view of the thermal video camera 105. The video analysis server 120 can be configured to receive a lookup table generated by the video camera 120 to map previously received thermal video content that used different quantization parameters and re-quantize the video content using the lookup table.

The data access module 226 can be configured to access data stored in the data store 230 and write data to data store 230. The data access module 226 can be configured to read and/or write data to memory 220. The data store 230 can be used to store stored images and background models derived by the video processing module 224 from data received from the thermal video camera 105.

Figure 3:
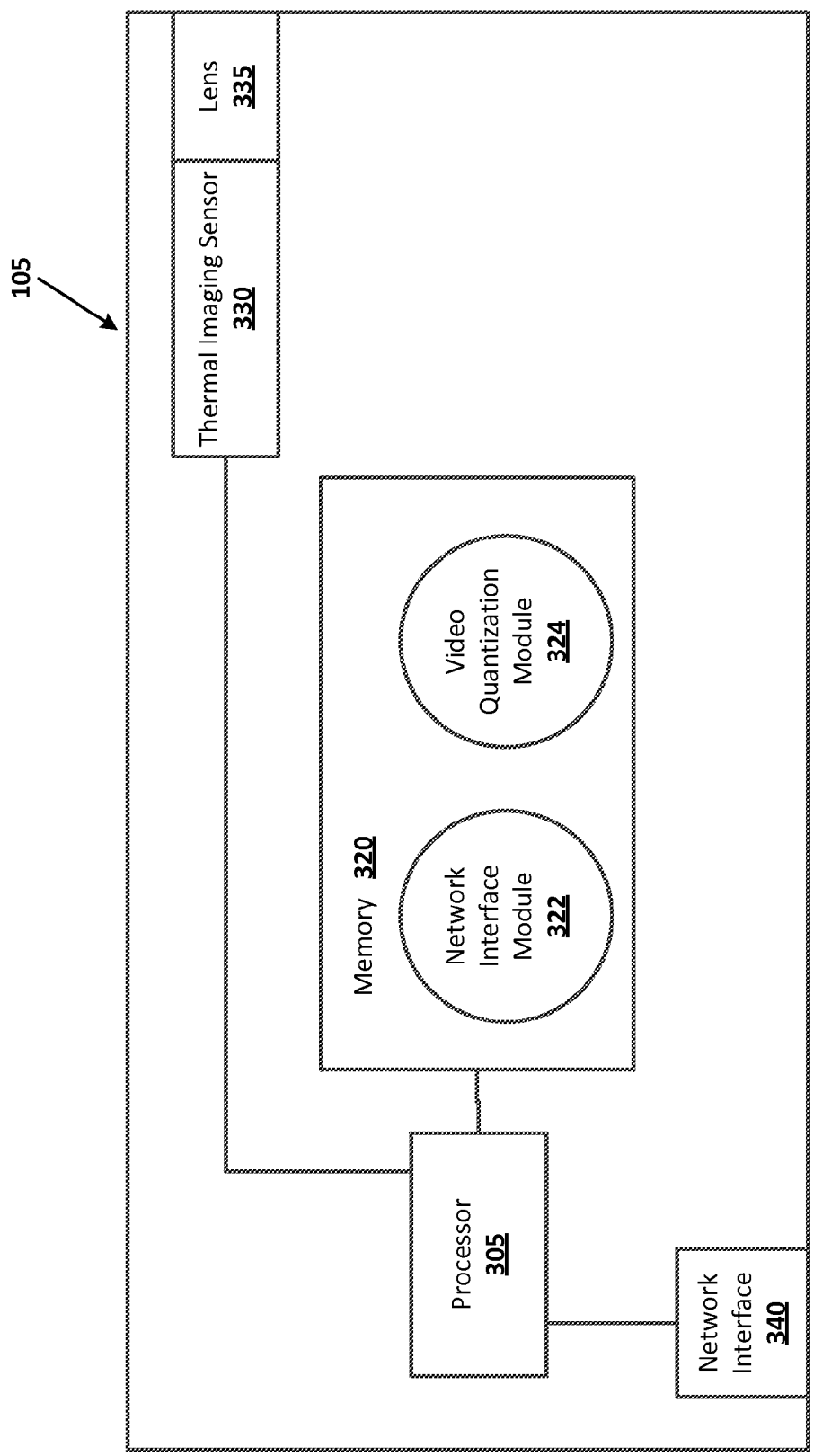
FIG. 3 is a block diagram of a thermal video camera illustrated in FIG. 1.

FIG. 3 is a block diagram of an example of the thermal video camera 105 illustrated in FIG. 1. Thermal video camera 105 includes a processor 305, a memory 320, a thermal sensor 330, a lens 335, and a network interface 340. The memory 320 includes a network interface module 322 and a video quantization module 224. The memory 220 can comprise one or more types of tangible, non-transitory computer-readable memory, such as random-access memory (RAM), read-only memory (ROM), flash memory, or a combination thereof. The modules can comprise processor-executable instructions that can be executed by processor 305.

The lens 335 is configured to capture infrared radiation received from a scene being monitored by the thermal video camera 105 and to focus the received infrared radiation on the thermal imaging sensor 330.

The thermal imaging sensor 330 is configured to detect infrared radiation within the infrared range of the electromagnetic spectrum. The infrared range includes wavelength approximately within the 9000 to 14,000 nanometers range. Various types of thermal imaging sensors 330 can be used in the thermal video camera 105, such as indium antimonide (InSb), iridium gallium arsenide (InGaAs), mercury cadmium telluride (CMT), or quantum well infrared photodetector (QWIP) focal plane arrays (FPAs) that respond to mid-wavelength and/or long-wavelength infrared radiation. Thermal imaging sensor 330 outputs a signal that can be processed by the video quantization module before being transmitted to the video analysis server 120 where video analytics algorithms can be applied to the quantized video content.

The processor 305 can comprise one or more microprocessors configured to access memory 320. The processor 305 can read data from and write data to memory 320. The processor 305 can also read executable program code from memory 320 and execute the program code. The memory 320 can include a set of modules comprising executable program code that can be executed by the processor 305.

The network interface module 322 is configured to receive data from the network 115 via network interface 340. The network interface module 222 can also be configured to transmit information to the video analysis server 120 or other network-connected devices via network 140.

The video quantization module 324 is configured to process sensor data received from the thermal imaging sensor 330 to create thermal video content that represents the scene being monitored by the thermal video camera 105.

The video quantization module 324 can be configured to convert 12-bit (or more) video content to a lower-bit video content that can be processed by the video analytics algorithms implemented by the video analysis server 120. For example, the video quantization module 324 can be configured to convert greater than 8-bit thermal video data generated by the thermal sensor, such as 12-bit or 16-bit data, into 8-bit data as expected by the analytics algorithms. The video quantization module 324 can be configured to calculate the parameters for quantization of the thermal video data periodically to provide better quality video content for coding. The video quantization module 324 can transmit the quantization information with the video content to the video analysis server 120 via the network interface module 322. The video analysis server 120 can use the quantization information to when analyzing the video content provided by the thermal camera 105 to avoid false detection of events due to changes in contrast and/or brightness in the video content provided by the thermal video camera 105.

The video quantization module 324 of the video camera 120 can be configured to create a lookup table that can be used to convert the data quantized with previous quantization parameters to the data quantized with current quantization parameters. The video analysis server 120 can use the lookup table to map previously received thermal video content that used different quantization parameters and re-quantize the video content using the lookup table.

Figure 4:
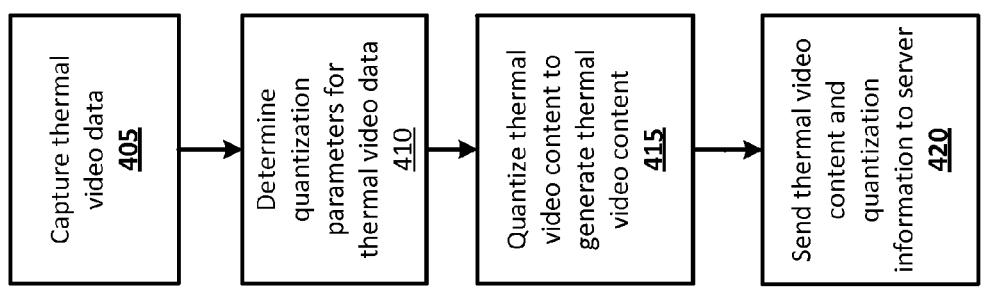
FIG. 4 is a flow diagram of a method for processing video content in a video camera.

FIG. 4 is a flow diagram of a method for processing video content in a video camera. The method can be implemented by thermal video camera 105.

The method begins with capturing thermal video data (stage 405). The thermal video data can be captured by the a thermal imaging sensor of the video camera.

Figure 6:
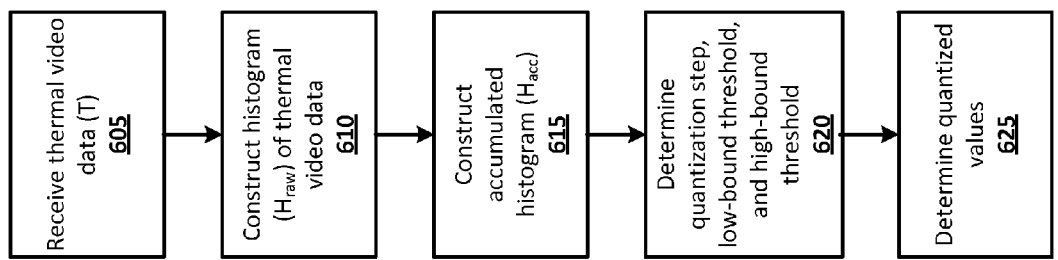
FIG. 6 is a flow diagram of a method for quantization of thermal video data.

Quantization parameters for the video content can be determined (stage 410). The quantization process can include converting the video content from a higher bit-depth to a lower bit-depth. In an example, the video content can be captured as 12-bit video content and be converted from a 12-bit to 8-bit video content. An example of how quantization parameters are determined is illustrated in FIG. 6, which is described in detail below.

The video content can then be quantized to generate quantized thermal video content (stage 415). The quantized thermal video content and quantization parameters can be sent to the server (stage 420). The video camera can be configured to transmit the quantized thermal video content and the quantization parameters to a video analysis server. The video analysis server can be configured to store the quantized video content and the quantization parameters, to display the quantized video to users, and to requantize video content that has been previously received from the video camera using the quantization parameters provided by the video camera. The method illustrated in FIG. 5 provides an example of a method where thermal video content previously received from a thermal video camera can be re-quantized if the quantization parameters provided by the video camera changes.

Figure 5:
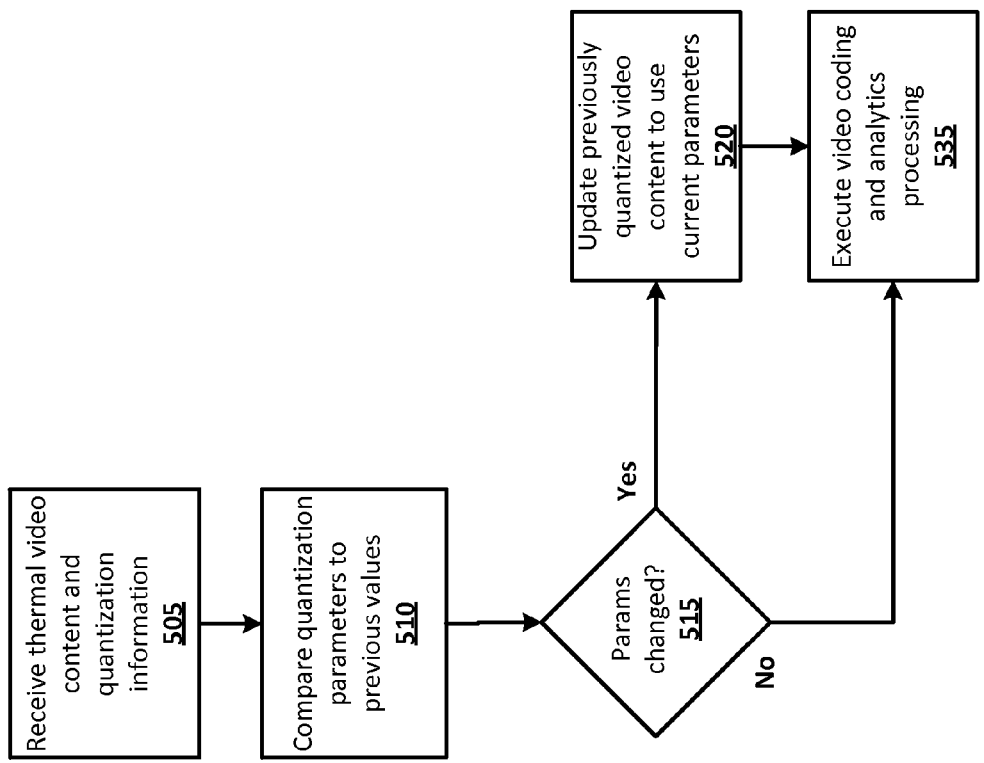
FIG. 5 is a flow diagram for processing video content received from a thermal video camera.

FIG. 5 is a flow diagram for processing video content received from a thermal video camera, such as thermal video camera 105. The method illustrated in FIG. 5 can be implemented in video analysis server 120.

Thermal video content and current quantization parameters for that thermal video content are received (stage 505). The quantization parameters used to quantize the video can change over time. For example, as a scene being monitored changes from day to night or from sunny to cloudy, the quantization parameters used to quantize the video content may change. The quantized thermal video content can be analyzed by video analytics algorithms to identify potential threats or other events in the thermal video content. If the quantization parameters used to quantize the thermal video content have changed, the video analytics algorithms that analyze the thermal video content may generate false positives or miss potential threats due to changes in the quantization parameters over time.

The current quantization parameters received with the quantized video content can be compared to quantization parameters associated with previously received quantized thermal video content (stage 510). As previously indicated, the current quantization parameters associated with video content received from the thermal video camera may different than the quantization parameters used to quantize video that was previously received due to changing lighting or thermal conditions at the scene being monitored. The thermal quantization parameters can be updated periodically. In one example, the thermal quantization parameters are updated every ten seconds. However, in other implementations, the interval between the updating the quantization parameters can be longer or shorter.

A determination is made whether the quantization parameters have changed (stage 515). The quantization parameters associated with previously received video content can be compared to the current quantization parameters received with video content to determine whether there are any differences in the quantization parameters. If the quantization parameters have not changed, the video coding and analytics processing can be performed on the thermal video content (stage 535). If the quantization parameters have not changed, no action is taken to requantize the previously received video content because the quantization parameters have not changed. The quantization parameters can also be compared and if the changed quantization parameters have changed less than a threshold value such that the changes are not likely to affect video analytics algorithms analyzing the content, the previously received video content is not requantized. The previously received video content may, however, be requantized later if subsequent changes to the quantization parameters exceed the thresholds.

If changes to the quantization parameters have been detected, previously quantized video content can be updated with the new quantization parameters (stage 520). The background model and other related video content can also be updated to use the new quantization parameters. A lookup table can be created to re-quantize the previously quantized video content and/or the background model using the new quantization parameters. The lookup table can be used to map the quantized data for the previously received thermal video content with previous quantization parameters to re-quantized data with current quantization parameters.

The converted images can then be provided to the video analytics algorithms for analysis and other processing (stage 535).

FIG. 6 is a flow diagram of a method for quantization of thermal video data. The method illustrated in FIG. 6 can be implemented by the video quantization module 324 of the video camera 105. The method illustrated in FIG. 6 can be implemented as part of stage 410 of the method illustrated in FIG. 4. The thermal video camera 105 can then send the quantization information and the quantized video content to the video analysis server 120.

The quantization techniques disclosed herein make reference to the following quantization parameters:
$B_l$—low bound of raw thermal data
$Q_s$—quantization step of raw thermal data The quantization techniques disclosed herein also make reference to the following parameters that can be used for calculating the quantization parameter:
$B_h$—high-bound of raw thermal data
$T_l$—a low-bound threshold of number of pixels for dynamic range detection
$T_h$—a high-bound threshold of number of pixels for dynamic range detection
$H_{raw}$—histogram of raw thermal data The method begins with receiving thermal video data (T) acquired by the a thermal video camera (stage 605). The video quantization module 324 of the thermal video camera can be configured to construct a histogram ($H_{raw}$) of the raw thermal data received from the thermal video camera (stage 610). An accumulated histogram ($H_{acc}$) can then be constructed from the $H_{raw}$ histogram can be determined using the following equation (stage 615):

$$H_{acc(i)} = \sum_{k=0}^{i} H_{raw}(k), i \in [0, 2^{N_p} - 1]$$

where p is the number of bits of the thermal data. $H_{acc}$ is monotonic. Therefore, the low bound $B_l$ and the high bound $B_h$ of the dynamic range can be determined by comparing $H_{acc}(i)$ and $T_l$ and $T_h$. With $T_l$ and $T_h$, bad pixels and other noise can be removed from the video content.

A quantization step, low-bound threshold, and high bound threshold can be determined based on the accumulated histogram (stage 620). The quantization step $Q_s$ can be determined using the following equation:

$$Q_s = \left\lceil \frac{B_h - B_l}{N_s} \right\rceil$$

$N_S=2^8-1$ is the range of the thermal video data to be quantized.

The quantized value $Y'_i$ can be calculated based on the original value $Y_i$ using the following equation (stage 625):

$$Y'_i = \frac{Y_i - B_i}{Q_S}, \, i \in [0, M \times N - 1]$$

where M represents the number of rows in the image and N represents the number of columns in the image, and where $Y_i$ represents raw video data to be quantized. For example, $Y_i$ can comprise 12 or 16 bit video data depending on the implementation.

Figure 7:
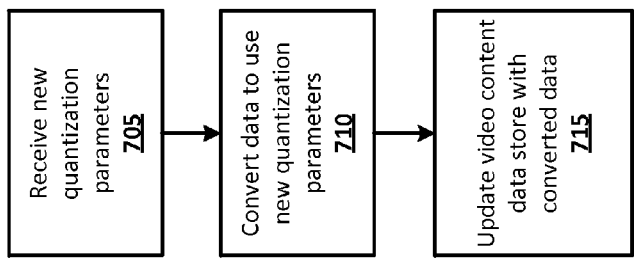
FIG. 7 is a flow diagram of a method for re-quantization of thermal video data.

FIG. 7 is a method for re-quantization of video data to use new quantization parameters. The method illustrated in FIG. 7 can be implemented by the video processing module 224 of the video analysis server 120.

A new set of quantization parameters is received (stage 705). The quantization parameters can be determined in step 620 of the method illustrated in FIG. 6. The quantization parameters used by the thermal video camera to quantize the thermal video content may change due to changing conditions at the scene being monitored. For example, changing lighting conditions and temperature changes over the course of a day can cause significant temperature changes in the scene and can result in changes to the quantization parameters used to quantize the thermal video content.

In order to keep the consistency for the current quantized image and the stored images from the previous quantization parameters, the previously quantized images and background model can be converted using the current quantization parameters (stage 710). This conversion can be performed using the following equation:

$$Y''_i = \frac{Y'_i * Q'_S + (B'_i - B''_i)}{Q''_S}$$

where $Y'_i$ is the quantized value with the previous quantization parameters and $B'_i$ is the previous low bound and $Q'_s$ is the previous quantization step.

The converted images can then optionally be stored in the data store 230 (stage 715). The converted images can then be provided to the video analytics algorithms for analysis.

The quantization technique illustrated in FIGS. 6 and 7 is one possible method that can be implemented in a thermal imaging system 100 for implementing the re-quantization techniques disclosed herein. Other methods can be implemented. For example, in a histogram equalization method, in which the histogram of a thermal image is constructed and the data can then be quantized with the distribution of the data. These steps can be performed within the image pipe or performed after the processing in the image pipe. A lookup table can then be generated that can be used to map the thermal data to the 8-bit data.

A second lookup table, a histogram equalization table, can then be constructed to convert previously quantized images according to the new histogram equalization table. The second lookup table can be constructed by the video camera and send to the video analysis server or can be constructed by the video analysis server based on the quantization parameters received from the thermal video camera. Whichever quantization method is applied, the corresponding quantization and conversion can be applied to stored content captured using previous quantization parameters and background models. The converted content can then be used for video analytics. Converting the previously quantized content to use the current quantization parameters can help to identify suspicious objects or motions captured in the video content.

Figure 8:
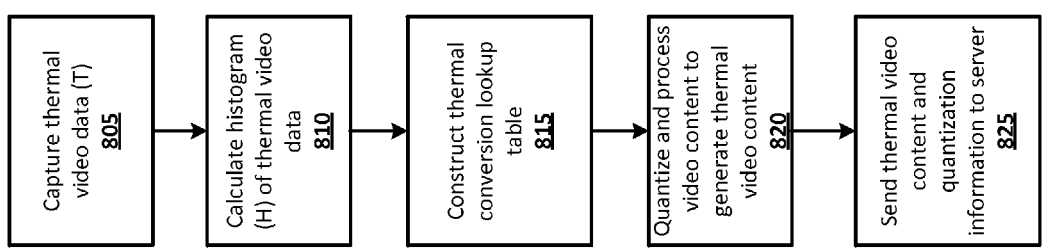
FIG. 8 is a flow diagram of another method for quantization of thermal video data.

FIG. 8 is a flow diagram of another method for processing video content in a video camera. The method illustrated in FIG. 8 can be implemented by video camera 105.

The method begins with capturing thermal video data (stage 805). A histogram of the raw thermal data received from the thermal imaging sensor 330 is created (stage 810). A quantization parameter lookup table can be generated based on the histogram (stage 815). The lookup table can be used to convert the quantization parameters associated with the current thermal sensor data with previous quantization values that were associated with previously generated thermal sensor data.

Figure 9:
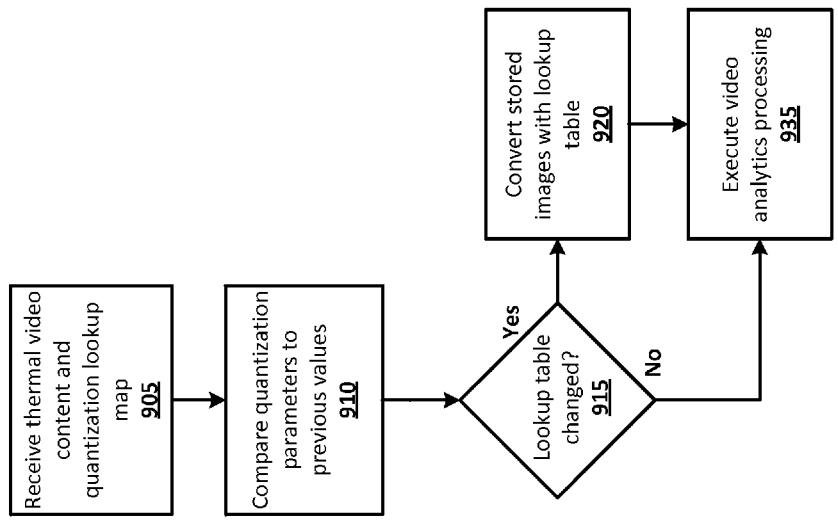
FIG. 9 is a flow diagram of another method for re-quantization of thermal video data.

The video content can then be quantized using the quantization parameters to generate quantized thermal video content (stage 825). The quantized thermal video content and the quantization parameter lookup table can be sent to a video analysis server (stage 825). The video analysis server can be configured to receive, store, display, and/or process the thermal video content and the quantization information provided by the thermal video camera. The video analysis server can also be configured to provide FIG. 9 is a flow diagram another method for re-quantization of thermal video data received from a thermal video camera, such as thermal video camera 105. The method illustrated in FIG. 9 can be implemented in video analysis server 120. In the method illustrated in FIG. 9, quantized vide from the image pipe of the thermal camera and the quantization parameters are fed to the video analytics algorithm. This approach does not require that the video analytics algorithm quantize the input image and the video analytics algorithms may only convert stored images or background information that were quantized using the old quantization parameters by using the new quantization parameters.

Thermal video content and a quantization conversion lookup table for the thermal video content are received (stage 905). The lookup map received from the thermal video camera 105 can be compared to a previously received lookup map associated with previously received thermal video content (stage 910). A determination is made whether the quantization parameters have changed based on the lookup table provided by the thermal video camera 105 (stage 915). If the quantization parameters have not changed, the video coding and analytics processing can be performed on the thermal video content (stage 935). If the quantization parameters have not changed, the previously received thermal video content is not requantized to use the new quantization parameters.

Stored video content that was encoded using the previous quantization parameters can be converted to use the new quantization parameter settings using the lookup maps received from the thermal video camera (stage 920).

The various illustrative logical blocks, modules, and algorithm stages described may be implemented as electronic hardware, computer software, or combinations of both. To clearly illustrate this interchangeability of hardware and software, various illustrative components, blocks, modules, and stages have been described above generally in terms of their functionality. Whether such functionality is implemented as hardware or software depends upon the design constraints imposed on the overall system. The described functionality can be implemented in varying ways. In addition, the grouping of functions within a module, block or stage is for ease of description. Specific functions can be moved from one module or block without departing from the disclosure.

The various illustrative logical blocks and modules described can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, multiple microprocessors, one or more microprocessors in conjunction with a DSP core, or any other such configuration.

The operations of a method or algorithm described may be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various changes and modifications could be made to the descriptions provided above without departing from the scope of the disclosure or the appended claims. For example, although elements may be described or claimed in the singular, the plural may be included. Additionally, all or portions of aspects and/or embodiments may be utilized with other aspects and/or embodiments.

What is claimed is:

1. A method for processing video content in a video camera, the method comprising:
    capturing thermal video data using a thermal imaging sensor;
    determining quantization parameters for the thermal video data, wherein determining the quantization parameters for the thermal video data further comprises constructing a histogram of the thermal video data captured by the thermal imaging sensor;
    calculating an accumulated histogram based on the thermal video data by solving the following equation:

$$H_{acc(i)} = \sum_{k=0}^{i} H_{raw}(k), i \in [0, 2^P - 1]$$

wherein p is the number of bits of the raw thermal data, $H_{acc}$ represents the accumulated histogram based on the thermal video data, and $H_{raw}$ represents a histogram of raw thermal video data captured by the video camera;
    quantizing the thermal video data to generate quantized thermal video data content;
    transmitting the quantized thermal video data stream and the video quantization parameters to a video analytics server over a network.

2. The method of claim 1, further comprising:
    determining a low-bound threshold and a high-bound threshold for the thermal video data; and
    determining a quantization step for the thermal video data.

3. The method of claim 2 wherein determining the quantization step includes solving the following equation:

$$Q_S = \frac{B_h - B_l}{N_S}$$

wherein $B_h$ is the high-bound of raw thermal video data received from the thermal imaging sensor, $B_l$ is the low bound of thermal video data received from the thermal imaging sensor, and $N_s$ is the range of the thermal video data.

4. The method of claim 3 wherein quantizing the thermal video data to generate the quantized thermal video data content and video quantization information further comprises solving the following equation:

$$Y'_i = \frac{Y_i - B_l}{Q_S}, i \in [0, M \times N - 1]$$

wherein $Y'_i$ represents a quantized value based on a value Y, from the raw thermal video data, $Q_s$ represents a quantization step, M represents a number of rows of data in an image of the thermal video data, and N represents a number of columns of data in the image.

5. The method of claim 1 wherein determining quantization parameters for the video data further comprises generating a lookup table to map the quantized data for previously received thermal video content to quantization data for the thermal video content.

6. A thermal video camera comprising:
    means for capturing thermal video data using a thermal imaging sensor;
    means for determining quantization parameters for the thermal video data, the means for determining the quantization parameters for the thermal video data further comprising means for constructing a histogram of the thermal video data captured by the thermal imaging sensor;
    means for calculating an accumulated histogram based on thermal video data by solving the following equation:

$$H_{acc(i)} = \sum_{k=0}^{i} H_{raw}(k), i \in [0, 2^P - 1]$$

wherein p is the number of bits of the raw thermal data $H_{acc}$ represents the accumulated histogram based on thermal video data and $H_{raw}$ represents a histogram of raw thermal video data captured by the video camera
    means for quantizing the thermal video data to generate a quantized thermal video data content; and
    means for transmitting the quantized thermal video data stream and the video quantization parameters to a video analytics server over a network.

7. The thermal video camera of claim 6, further comprising:
    means for determining a low-bound threshold and a high-bound threshold for the thermal video data; and
    means for determining a quantization step for the thermal video data.

8. The thermal video camera of claim 7 wherein the means for determining the quantization step includes means for solving the following equation:

$$Q_S = \frac{B_h - B_l}{N_S}$$

wherein $B_h$ is the high-bound of raw thermal video data received from the thermal imaging sensor, $B_l$ is the low bound of thermal video data received from the thermal imaging sensor, and $N_s$ is the range of the quantized thermal video data.

9. The thermal video camera of claim 8 wherein the means for quantizing the thermal video data to generate the quantized thermal video data content and video quantization information further comprises means solving the following equation:

$$Y'_i = \frac{Y_i - B_l}{Q_S}, i \in [0, M \times N - 1]$$

wherein $Y'_i$ represents a quantized value based on the value $Y_i$, from the raw thermal video data, $Q_s$ represents a quantization step, M represents a number of rows of data in an image of the thermal video data, and N represents a number of columns of data in the image.

10. The thermal video camera of claim 6 wherein the means for determining quantization parameters for the video data further comprises means for generating a lookup table to map the quantized data for previously received thermal video content to quantization data for the current thermal video content.

11. A non-transitory computer-readable medium having stored thereon computer-executable instructions for processing video content, comprising:
  code for capturing thermal video data using a thermal imaging sensor;
  code for determining quantization parameters for the thermal video data, wherein the code for determining the quantization parameters for the thermal video data further comprises code for constructing a histogram of the thermal video data captured by the thermal imaging sensor;
  code for calculating an accumulated histogram based on thermal video data by solving the following equation:

$$H_{acc(i)} = \sum_{k=0}^{i} H_{raw}(k), i \in [0, 2^p - 1]$$

wherein p is the number of bits of the thermal data, $H_{acc}$ represents the accumulated histogram based on thermal video data and $H_{raw}$ represents a histogram of raw thermal video data captured by the video camera;
  code for quantizing the thermal video data to generate a quantized thermal video data content and video quantization parameters; and
  code for transmitting the quantized thermal video data stream and the video quantization parameters to a video analytics server over a network.

12. The medium of claim 11, further comprising:
code for determining a low-bound threshold and a high-bound threshold for the thermal video data; and
code for determining a quantization step for the thermal video data.

13. The medium of claim 12 wherein the code for determining the quantization step includes code for solving the following equation:

$$Q_S = \frac{B_h - B_l}{N_S}$$

wherein $B_h$ is the high-bound of raw thermal video data received from the thermal imaging sensor, $B_l$ is the low bound of thermal video data received from the thermal imaging sensor, and $N_s$ is the range of the raw thermal video data.

14. The medium of claim 13 wherein the code for quantizing the thermal video data to generate the quantized thermal video data content and video quantization parameters further comprises code for solving the following equation:

$$Y'_i = \frac{Y_i - B_l}{Q_S}, i \in [0, M \times N]$$

wherein $Y'_i$ represents a quantized value based on the value $Y_i$ from the raw thermal video data, $Q_s$ represents a quantization step, M represents a number of rows of data in an image of the thermal video data, and N represents a number of columns of data in the image.

15. The medium of claim 11 wherein the code for determining quantization parameters for the video data further comprises code for generating a lookup table to map the quantization data for the previously thermal video content to quantization data for current received thermal video content.

16. A thermal video camera comprising:
  a thermal imaging sensor configured to output thermal video data;
  a processor configured to execute program instructions to process the thermal video data output by the thermal imaging sensor;
  a tangible computer-readable memory coupled to processor; and
  a video quantization module stored in the memory, the video quantization module being configured to:
    determine quantization parameters for the thermal video data, the video quantization module being configured to construct a histogram of the thermal video data captured by the thermal imaging sensor when determining the quantization parameters for the thermal video data,
    calculate an accumulated histogram based on thermal video data by solving the following equation to calculate the accumulated histogram based on thermal video data:

$$H_{acc(i)} = \sum_{k=0}^{i} H_{raw}(k), i \in [0, 2^{N_p} - 1]$$

wherein p is the number of bits of the thermal data $H_{acc}$ represents the accumulated histogram based on thermal video data and $H_{raw}$ represents a histogram of raw thermal video data captured by the video camera;

quantize the thermal video data to generate a quantized thermal video data content and video quantization information, and transmit the quantized thermal video data stream and the video quantization information to a video analytics server over a network.

17. The camera of claim 16, wherein the video quantization module is further configured to:
   determine a low-bound threshold and a high-bound threshold for the thermal video data; and
   determine a quantization step for the thermal video data.

18. The camera of claim 17 wherein the video quantization module is configured to solve the following equation when determining the quantization step:

$$Q_S = \frac{B_h - B_l}{N_S}$$

wherein $B_h$ is the high-bound of raw thermal video data received from the thermal imaging sensor, $B_l$ is the low bound of thermal video data received from the thermal imaging sensor, and $N_s$ is the range of the thermal video data.

19. The camera of claim 16 wherein the video quantization module is configured to solve the following equation when quantizing the thermal video data to generate a quantized thermal video data content and video quantization parameters:

$$Y'_i = \frac{Y_i - B_l}{Q_S}, i \in [0, M \times N - 1]$$

wherein $Y'_i$ represents a quantized value based on the value $Y_i$ from the raw thermal video data, $Q_s$ represents a quantization step, M represents a number of rows of data in an image of the thermal video data, and N represents a number of columns of data in the image.

20. The camera of claim 16 wherein when determining quantization parameters for the video data the video quantization module is configured to generate a lookup table to map the quantization data for the thermal video content from quantization data for previously received thermal video content.

* * * * *

UNITED STATES PATENT AND TRADEMARK OFFICE
CERTIFICATE OF CORRECTION

PATENT NO. : 8,934,020 B2
APPLICATION NO. : 13/335703
DATED : January 13, 2015
INVENTOR(S) : Lei Wang, Farzin Aghdasi and Greg Millar It is certified that error appears in the above-identified patent and that said Letters Patent is hereby corrected as shown below:

In the Clams

Claim 4, Column 16, line 23, the term $Y_i$ is presented as Y,.
Please replace the (,) with subscript i.

Claim 6, Column 16, line 52, the issued patent does not include the (,) after "data" and before "$H_{acc}$".
Please insert the --,--.

Claim 6, Column 16, line 54, the issued patent does not include the (,) after "data" and before "and".
Please insert the --,--.

Claim 11, Column 17, line 57, the issued patent does not include the (,) after "data" and before "and".
Please insert the --,--.

Claim 16, Column 18, line 64, the issued patent does not include the (,) after "data" and before "$H_{acc}$".
Please insert the --,--.

Claim 16, Column 18, line 66, the issued patent does not include the (,) after "data" and before "and".
Please insert the --,--.

Signed and Sealed this
Fourth Day of August, 2015

Michelle K. Lee
*Director of the United States Patent and Trademark Office*

UNITED STATES PATENT AND TRADEMARK OFFICE
CERTIFICATE OF CORRECTION

PATENT NO.        : 8,934,020 B2
APPLICATION NO.   : 13/335703
DATED             : January 13, 2015
INVENTOR(S)       : Wang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this
Twentieth Day of October, 2015

Michelle K. Lee
*Director of the United States Patent and Trademark Office*